United States Patent [19]
Kato et al.

[11] Patent Number: 5,120,270
[45] Date of Patent: Jun. 9, 1992

[54] CONTROL SYSTEM FOR A VEHICLE AIR CONDITIONING DEVICE

[75] Inventors: Hiroyuki Kato; Tokuhiro Amano, both of Aichi, Japan

[73] Assignee: Kabushiki-Kaisha Tokai-Rika-Denki-Seisakusho, Japan

[21] Appl. No.: 575,440

[22] Filed: Aug. 30, 1990

[30] Foreign Application Priority Data

Sep. 5, 1989 [JP] Japan .................. 1-104302[U]

[51] Int. Cl.$^5$ .................. F25B 29/00; B60H 3/00
[52] U.S. Cl. .................. 454/126; 454/156
[58] Field of Search .................. 98/2.08, 2.05, 2.06

[56] References Cited

U.S. PATENT DOCUMENTS

| | | | |
|---|---|---|---|
| 2,929,310 | 3/1960 | Getz | 98/2.06 |
| 4,355,752 | 10/1982 | Antoine | 98/2.06 |
| 4,448,035 | 5/1984 | Moriyama et al. | 62/176.6 |
| 4,478,049 | 10/1984 | Fukui et al. | 62/179 |
| 4,633,908 | 1/1987 | Hattori et al. | 98/2.08 |
| 4,681,153 | 7/1987 | Uchida | 165/31 |
| 4,685,508 | 8/1987 | Iida | 165/17 |
| 4,730,662 | 5/1988 | Kobayashi | 165/25 |
| 4,762,169 | 8/1988 | Andersen et al. | 98/2.08 |
| 4,791,981 | 12/1988 | Ito | 98/2.08 |
| 4,858,518 | 8/1989 | Yamaguchi et al. | 98/2.08 |
| 4,865,119 | 9/1989 | Okada | 165/16 |
| 4,953,630 | 9/1990 | Iida | 98/2.08 |

FOREIGN PATENT DOCUMENTS

| | | | |
|---|---|---|---|
| 0008105 | 1/1985 | Japan | 98/2.08 |
| 1226416 | 11/1989 | Japan . | |
| 2094509 | 9/1982 | United Kingdom . | |

OTHER PUBLICATIONS

Japanese Patent Document No. 1-41415.
Japanese Patent Document No. 56-34513.
Japanese Patent Document No. 58-194618.
Japanese Patent Document No. 59-202925.
Japanese Patent Document No. 61-50822.
Japanese Patent Document No. 63-269718.

*Primary Examiner*—Henry A. Bennet
*Assistant Examiner*—William C. Doerrler
*Attorney, Agent, or Firm*—Sixbey, Friedman, Leedom & Ferguson

[57] ABSTRACT

An air conditioning device for a vehicle comprising a temperature adjusting dial which is moved from a low temperature indication to a high temperature indication by an occupant. The air conditioning device includes a blower by which a volume of air blown is gradually changed from a maximum air volume to a minimum air volume to the maximum air volume again in accordance with the position of the temperature adjusting dial, a first changeover damper for changing the blowing direction of the air from the upper half of the body of the occupant to the lower half of the body of the occupant in accordance with the position of the temperature dial, and a second changeover damper for drawing in inside or outside air wherein the volume of inside or outside air allowed to enter the device is primarily based upon the position of the temperature dial. The occupant can also choose inside or outside air independent from the degree of movement of the temperature dial.

25 Claims, 8 Drawing Sheets

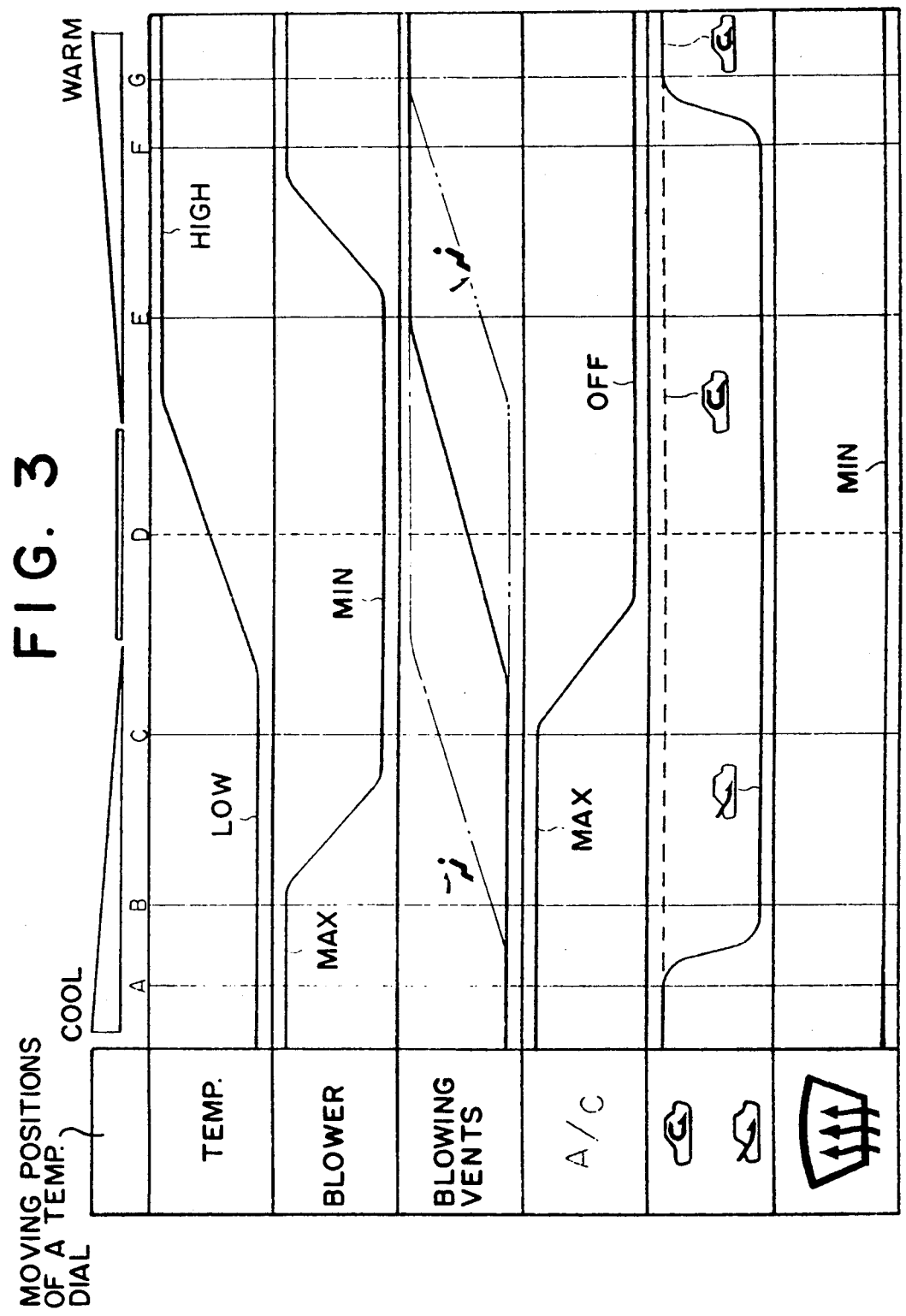

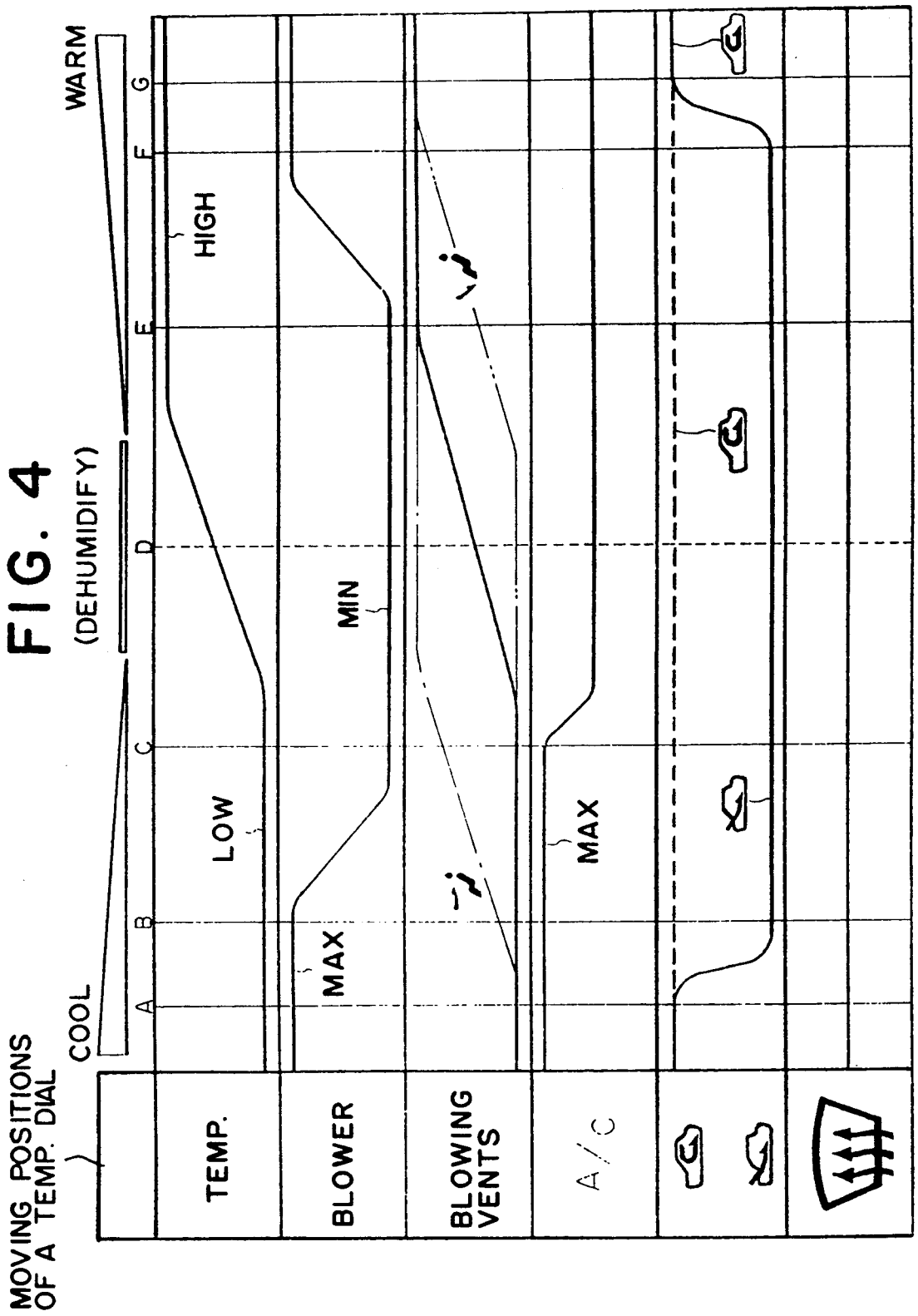

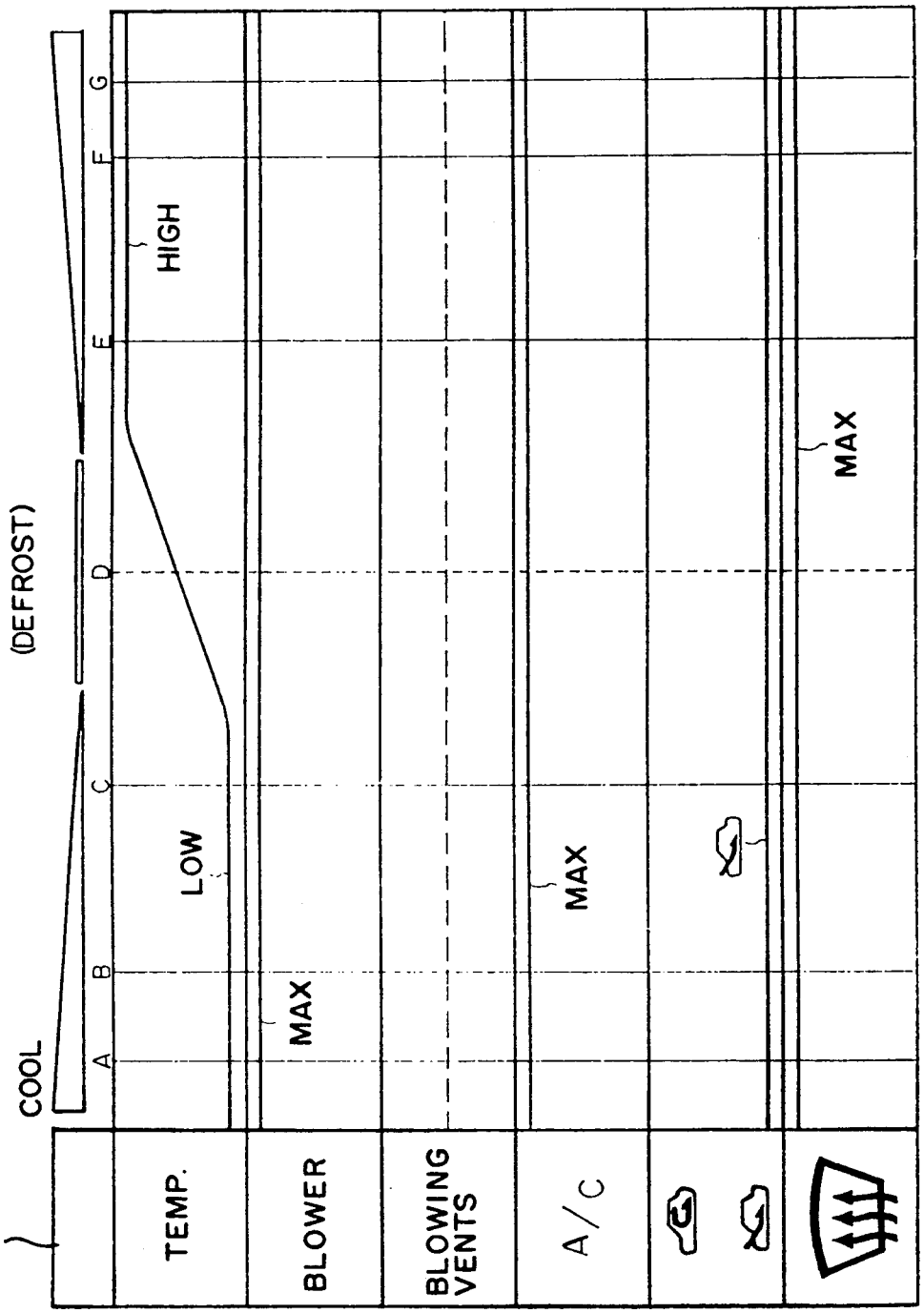

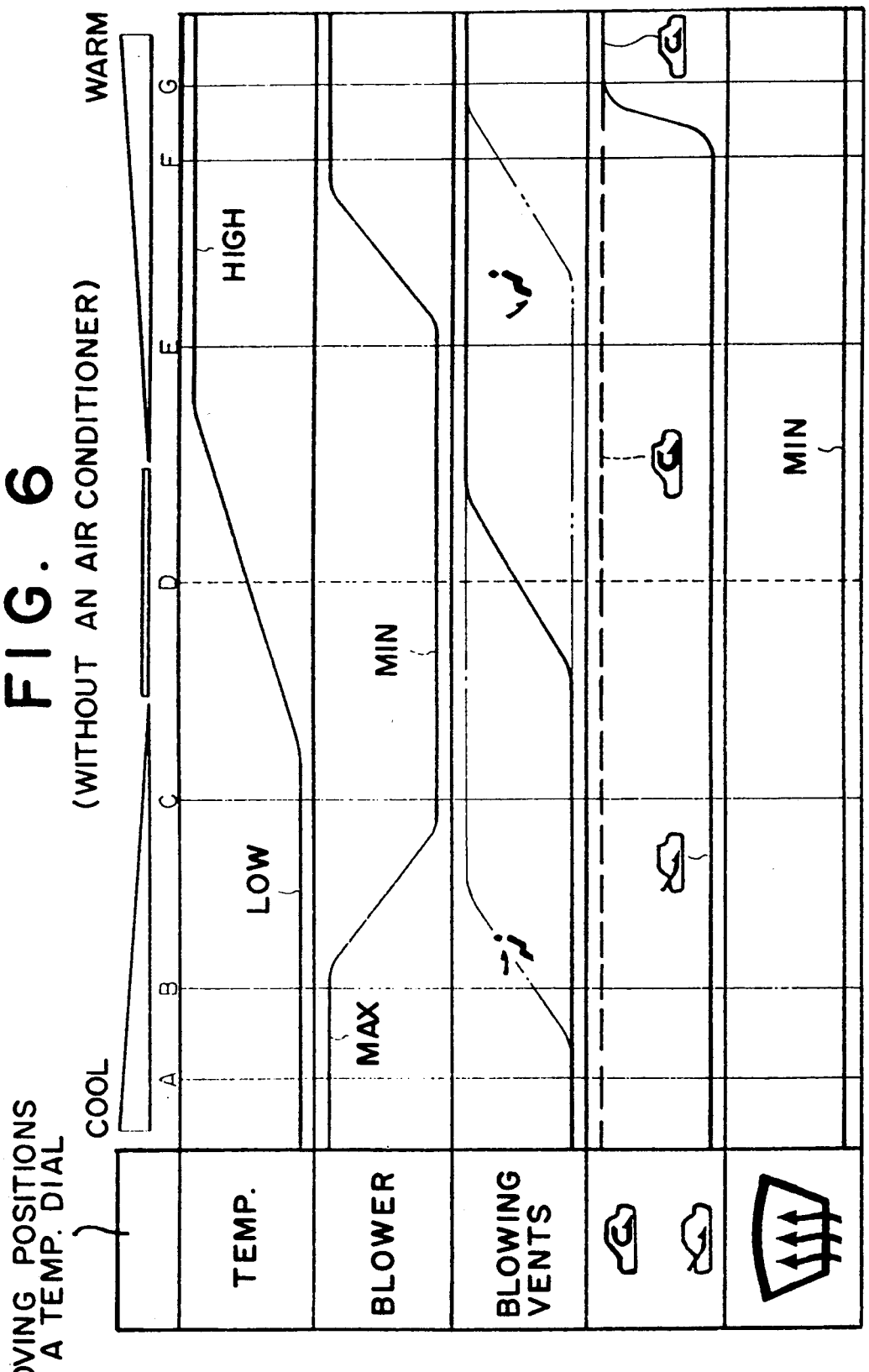

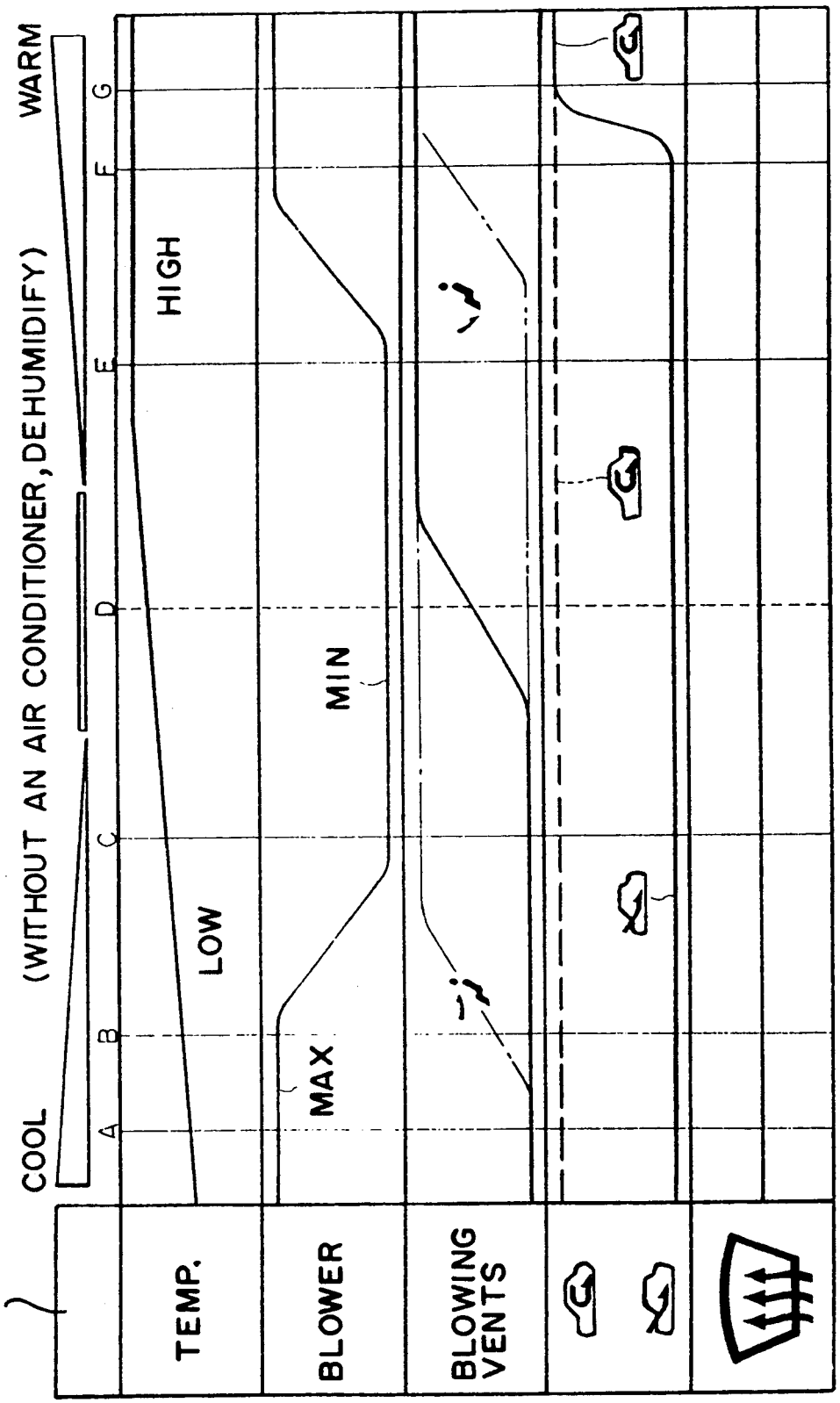

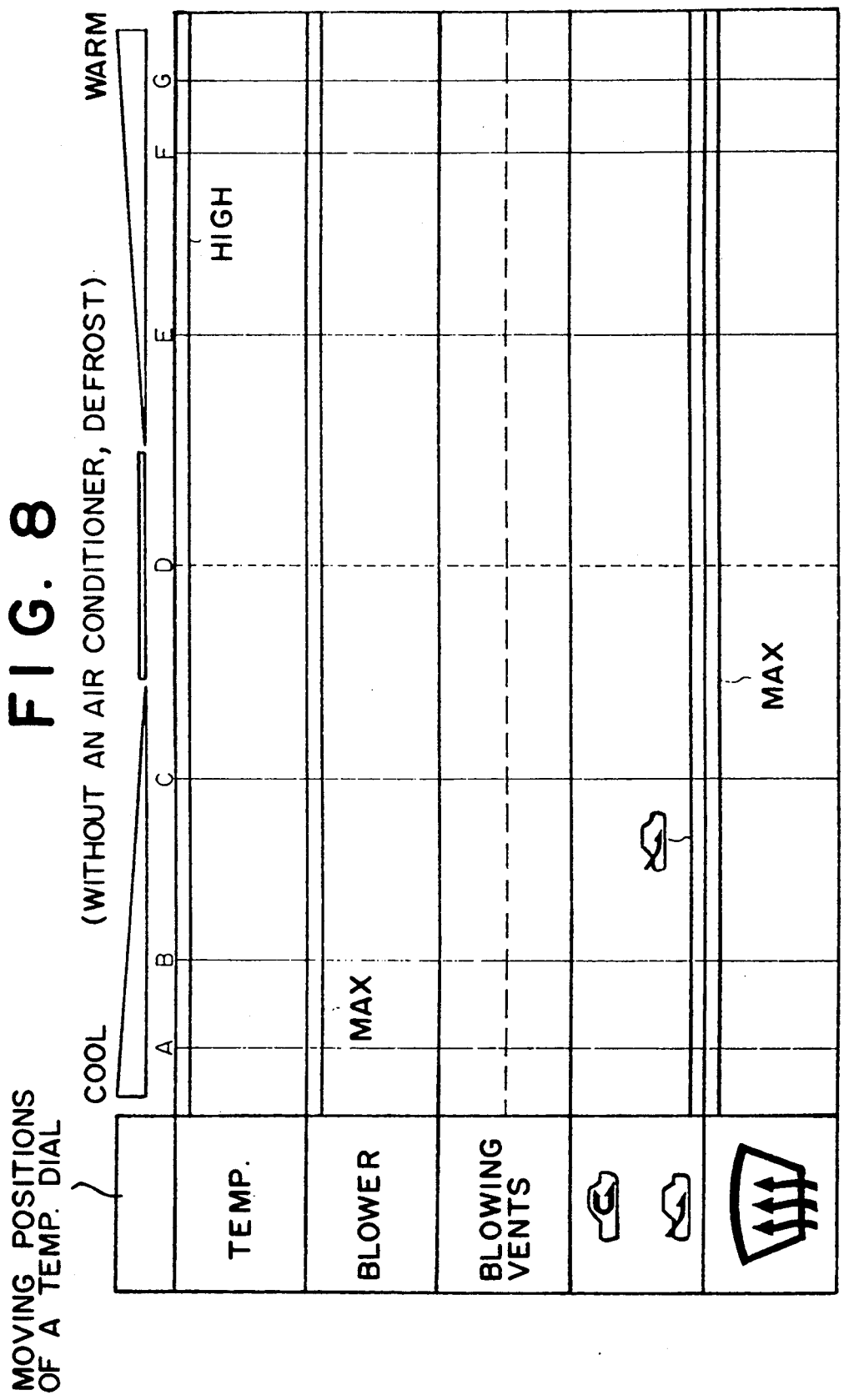

CONTROL SYSTEM FOR A VEHICLE AIR CONDITIONING DEVICE

BACKGROUND OF THE INVENTION

1. Field of the invention

The present invention relates to an air conditioning device for a vehicle for adjusting the temperature of the air inside the vehicle cabin.

2. Description of the Related Art

In conventional air conditioning devices, an occupant must make selections such as cabin temperature, volume of fan ventilation, vents and ventilation of inside/outside air by operating different buttons and so on. Therefore a number of operating levers and dials are mounted on the air conditioning device which the occupant must operate whenever needed.

On the other hand, with regard to this, an automatic air conditioner, that is, a device which automatically maintains a desired temperature through a controlling device for controlling a damper, an evaporator, a blower motor and so on separately by predetermining a temperature for inside a cabin has been used. However, even with this automatic air conditioner, the occupant must operate vents, a switch damper for inside/outside air and so on, making operation troublesome.

SUMMARY OF THE INVENTION

Accordingly, an object of the present invention is to provide an air conditioning device for a vehicle which is extremely simple for an occupant to operate.

The present invention is characterized in that the device has a temperature dial which is moved from a low temperature indication to a high temperature indication by an occupant, a blower wherein a blown wind volume is gradually changed from a maximum air volume a minimum air volume and furthermore gradually changed to the maximum air volume depending upon the positioning of the temperature dial, a changing means for altering the blowing direction, so that the blowing direction is gradually changed form the upper half of the body of the occupant to the lower half of the body of the occupant depending upon the positioning of the temperature dial and a switch means for drawing in inside and outside, the occupant can choose whether air inside the cabin is led to the blowing means or air outside the cabin is led to the blowing means when the air inside the cabin is selected, the air inside the cabin is led to the blowing means independently from the positioning the temperature dial when the air outside the cabin is selected, the condition under which the air inside the cabin is led to the blowing means is different from the condition under which the air outside the cabin is led to the blowing means under which the air inside the cabin is led to the blowing means in accordance with the degree of moving the temperature dial.

Therefore, in the present invention when the occupant wants to cool the air inside the cabin quickly, for example in the summer, the occupant moves the temperature dial to the lowest temperature indication position. This enables the blowing means to circulate the air inside the cabin back into the cabin in the largest volume. This allows a first supplying means to supply cool air at the largest volume. This cool air is blown toward the upper half of the body of the occupant. Therefore, the occupant receives cool wind immediately and the temperature inside the cabin falls quickly. With the temperature inside the cabin cooled off, the occupant can move the temperature dial from the low temperature indication to a slightly higher temperature indication which decreases the blowing volume, so that the blowing means gradually changes the fanning volume to the smallest area. Furthermore, when the occupant moves the temperature dial to the highest temperature indication side, the first supplying means is stopped and alternatively a heater is heated. The air inside the cabin passes through the heater and the blows blowing means the largest wind volume toward the lower half of the body of the occupant. This enables the occupant to receive warm air quickly to allow the temperature inside the cabin to rise quickly. The occupant can move the temperature dial to the low temperature indication area gradually causing the switching means to draw in the air outside the cabin and the blowing volume to gradually decrease. Also, the changing means gradually increases the fanning volume toward the upper half of the body of the occupant.

In this way, the occupant, by only operating the temperature dial, obtains a desired air conditioning condition. This operation is extremely simple.

In addition, when the switching means is chosen under the condition that the air inside the cabin is led to the blowing means, it is always circulated independently from the degree of movement of the temperature dial.

BRIEF DESCRIPTION OF THE DRAWINGS

FIG. 3 is a mode variation table of a vehicle provided with the air conditioning device in the present invention, FIG. 4 is a mode variation table of a vehicle provided with the air conditioning device showing dehumidification modes, FIG. 5 is a mode variation table of a vehicle provided with the air conditioning device showing defrost modes, FIG. 6 is a mode variation table of a vehicle not provided with an air conditioner, FIG. 7 is a dehumidification mode variation table of a vehicle not provided with an air conditioner and FIG. 8 is a defrost mode variation table of a vehicle not provided with an air conditioner.

DESCRIPTION OF THE PREFERRED EMBODIMENT

Figure 1:
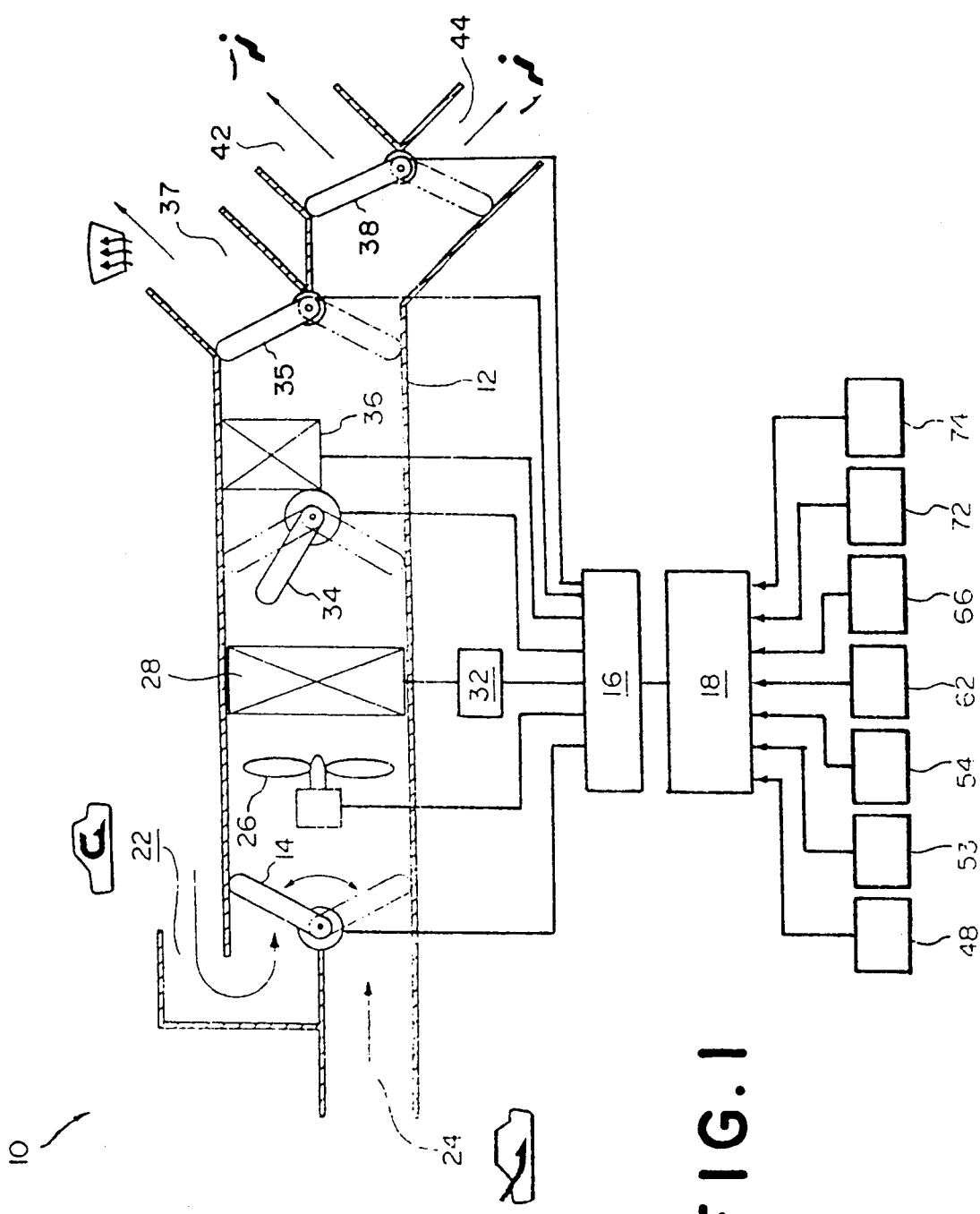
FIG. 1 is an overall schematic diagram of an air conditioning device to which the present invention is applied.

As shown in FIG. 1, in an air conditioning device 10, according to the present invention, a changeover damper 14 serving as an inside/outside air intake changeover means is arranged at one end of a duct 12, the changeover angle being controlled by a controlling means 18 via a driving means 16. This changeover damper 14 communicates with an inside air intake vent 22 and an outside air intake vent 24 through a duct 12 according to its rotation angle. The volume of air supplied to the inside and outside of the cabin changes by that rotation angle. Even if this changeover damper 14 completely closes either the vent 22 or the vent 24, it is provided to lead to some extent inside air or outside air to the duct 12.

On the downstream side of this changeover damper 14 is a blower 26 arranged such that its number of revolutions is controlled by a controlling means connected to driving means 16. Furthermore, on the downstream side of the blower 26 an evaporator 28 is arranged to cool air generated by a compressor 32. Therefore, the inside air or outside air which is blown from the blower 26 is cooled by being passed through this evaporator 28 when the compressor 32 is operating by means of the driving means 16, which is controlled by the controlling means 18.

On the downstream side of the evaporator 28, a cool air/warm air damper 34 and a heater 36 are arranged within duct 12. The rotation of the damper 34 is driven by driving means 16, which is controlled by the controlling means 18 in the same way as the changeover damper 14 to adjust the volume of air which passes through the heater 36. The controlling means 18 controls the temperature of the air passing through heater 36.

On the downstream side of the heater 36, a defrosting damper 35 is arranged. The defrosting vent 37 opens and closes through the rotation of the defrosting damper 35 allowing warm air to blow therethrough. This defrosting vent 37 opening is heated, in particular, at the lower portion of the front windshield. Furthermore, the defrosting damper 35 is also controlled by the controlling means 18 via the driving means 16.

On the downstream side of the defrosting damper 35, a second changeover damper 38 for changing two blower vents is arranged and provided to be controlled by the controlling means 18 via the driving means 16. This second changeover damper 38 is provided to adjust the volume of air blown through blower vent 42, which is directed toward the upper half of the occupant's body i.e., the face and so on, and blower vent 44, is directed toward the feet of the occupant, by changing the rotation angle. Therefore, the volume of cool air or warm air blown toward the upper half of the body and the lower half of the body of the occupant is changed by the rotation angle of the second changeover damper 38. This second changeover damper 38, in the same way as the changeover damper 14, allows some wind to blow toward the upper half of the body of the occupant, even if the blower vent 42 is completely closed, and some wind to blow toward the lower half of the body of the occupant, even if the blower vent 44 is completely closed.

Figure 2:
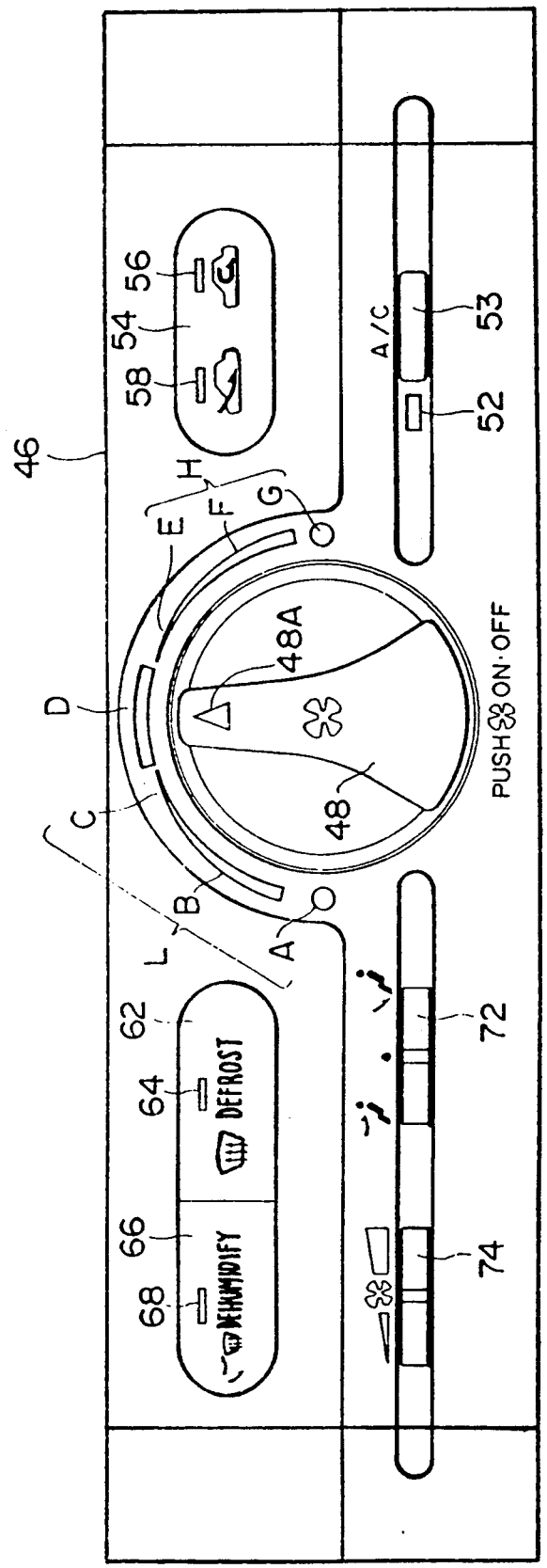
FIG. 2 is a front view showing an operation panel to which the present invention is applied.

In FIG. 2 an operation panel 46 which is mounted on a dashboard in the cabin is shown. There is a temperature dial 48 in the center portion of the operation panel 46 and its indicator 48A is provided to be rotatably directed to the low temperature indication area L or to the high temperature indication area H. The number of revolutions of this temperature dial 48 is transmitted to the controlling means 18.

This temperature dial 48 also operates as a switch by starting the blower 26 when it is pushed inward. By pressing this temperature dial 48 again, the operation of the blower 26 is stopped. After pressing this temperature dial 48 when a predetermined condition takes place, the compressor 32 starts to operate.

The operating condition of this compressor 32 is indicated by the illumination of an air conditioner indicator lamp 52, which is mounted on the lower right of the operation panel 46. Next to the air conditioner indicator lamp 52, an air conditioner switch 53 is arranged and connected with the controlling means 18, so that the operation of the compressor 32 is stopped by being pressed. By pressing the air conditioner switch 53 again, the compressor 32 is restarted.

On the upper right portion of the operation panel 46, the inside/outside air switch 54 is mounted. This switch 54 is connected to the controlling means 18 and comprises an inside air indicator lamp 56 indicative of the inside air selectivity condition and an outside air indicator lamp 58 indicative of the outside air intake condition. When the changeover damper 14 is provided to allow air inside the cabin only from the cabin air intake vent 22 through the duct 12 and the switch 54 is pressed the inside air indicator lamp 56 turns on and the changeover damper 14 is connected so as to close outside air intake vent 24 as represented by the phantom line state in FIG. 1. if the inside air indicator lamp 56 is in an "ON" state and the occupant presses the switch 54, the outside air indicator lamp 58 is turned on. Then by the rotational operation of the temperature dial 48, by the occupant the rotation angle of the changeover damper 14 is changed, so that the volume of air drawn through the vent 22 and the other vent 24 may be changed.

On the upper left portion of the operation panel 46, a defrosting switch 62 and a dehumidifying switch 66 are mounted and connected to the controlling means 18. On the defrosting switch 62 and the dehumidifying switch 66, a defrosting indicator 64 and a dehumidifying indicator 68 are mounted, respectively. By pressing these switches, they are turned on and by pressing them again they are turned off.

At the lower left portion of the operation panel 46, on the right side, air vent changeover dial 72 is mounted, while on the left side there is an air volume regulating dial 74. When the changeover dial 72 is rotated to the right, the air vent second changeover damper 38 opens the blower vent 44 wider to increase the volume of air blown toward the lower half of the body of the occupant. Reversely, when it is rotated to the left, the changeover damper 38 opens the blower vent 42 wider to increase the volume of air blown toward the upper half of the body of the occupant. The changeover dial 72 is connected to and controlled by the controlling means 18.

Furthermore, when the regulating dial 74 is rotated to the left side, the blower 26 rotates slowly and when rotated to the right, the blower 26 rotates rapidly. The regulating dial 74 is connected to the controlling means 18, so that the volume of air blown may be changed.

Now the operation of the present enbodiment is explained.

In FIG. 3 the rotating operation positions (A-G) of the temperature dial 48 are shown along the top horizontal row and depend upon the temperature inside the cabin, the volume of air blown by the blower, the blowing direction of the blower vent 42 and the other blower vent 44, the operation state of the air conditioner and the changeover state of the inside and outside air. Actually, the temperature dial 48 does not have to be stopped in stepped rotation positions. However, for convenience sake the rotation positions are explained in seven positions.

First, at a position A, wherein the temperature dial 48 is rotated to the largest degree on the low temperature indicating area L side after being pressed, the blower 26 is rotated to the largest degree in order to lower the temperature inside the cabin and the changing damper 38 opens the blower vent 42, completely, and closes the other blower vent 44 completely. In addition, the compressor 32 is operated at its fastest speed. The changeover damper 14 closes the outside air intake vent 24 and draws in air from inside the cabin from the inside air intake vent 22. Therefore, the air inside the cabin is suddenly blown by the fastest rotation speed of the blower 26, is quickly cooled by the compressor 32 being operated at its fastest speed and is supplied from the one blower vent 42 to the upper half of the body. Thus, the occupant is quickly cooled by directly receiving the low temperature air. Here, the defrosting blower vent 37 is still closed.

Next, at a position B, wherein the temperature dial 48 is rotated slightly to the right, the cabin temperature, the operation state of the blower 26, the rotation angle of the second changeover damper 38 and the operation state of the compressor 32 are similar to the position A. However, the changeover damper 14 closes the air intake vent 22 allowing the largest volume of outside air to be drawn in through air vent 24 (when it is chosen to draw in outside air). In this case too, a slight amount of air inside the cabin flows from the air intake vent 22 into the duct 12 and recirculates.

At a position C, wherein the temperature dial 48 is rotated rightward again on the low temperature indicating area L, it is different from the position B in that the volume of air blown by the blower 26 is held to the smallest volume.

When the temperature dial 48 is rotated past position C to the high temperature side, the heater 36 is driven and the cool air/warm air damper 34 gradually increases the ventilating volume depending upon the rotation of the temperature dial 48, so that the temperature of the blown wind rises gradually. At a position D, wherein the temperature dial 48 is positioned at the intermediate point between the low temperature indicating area L and the high temperature indicating area H (which is the condition shown in FIG. 2), the second changeover damper 38 transmits almost equally the volume of wind into the blower vent 42 and the other blower vent 44. Under this condition, the compressor 32 is stopped.

Furthermore, when the temperature dial 48 is moved to a state between the position C and the position D, the compressor 32 is repeatedly operated or stopped. The length of time stopped is gradually lengthened depending upon the degree of rotation of the temperature dial 48 toward the high temperature side. In addition, the ventilation volume to the heater is also increased, so that the temperature of the blown wind is changed from low temperature to high temperature.

At a position E, wherein the temperature dial 48 is slightly rotated toward the high temperature indicating limit H side, the volume of electricity to the heater 36 is at its highest and the ventilation volume supplied to the heater 36 is at its largest. In addition, position E is different from the position D in that the changeover damper 38 further opens the other blower vent 44, so that the largest volume of blown wind is blown into the other blower opening 44.

Furthermore, at a position F, wherein the temperature dial 48 is rotated to the right side from the position E within the high temperature indicating area H, it is different from the position E in that the wind volume of the blower 26 is held at the largest volume.

At a position G, wherein the temperature dial 48 is rotated to the right side to its farthest position within the high temperature indicating area H, it is different from position F in that the changeover damper 14 opens the air intake vent 22 for drawing in the largest volume of air from inside the cabin, so that the transmitted wind is recirculated mainly from the air intake vent 22.

Furthermore, if the temperature dial 48 is between positions B to F and the blower vent changeover dial 72 in FIG. 2 is changed, the blower vent switch position changes as illustrated by the phantom lines in FIG. 3. That is, if the blower vent changeover dial 72 is rotated to the right as far as possible and the blower vent curve shows that the temperature dial 48 is between position A and position B, a state occurs in which a gradual change begins from air being blown in the direction of the face to the direction of the legs (the blower vent changing damper 14 begins to open blower vent 44). When the temperature dial 48 is between position C and D, the blown air is directed solely toward the legs (the second blower vent changing damper 38 completely opens blower vent 44 and closes blower vent 42). When the temperature dial 48 is rotated from the low temperature side, to the high temperature side the changing period of the blower vents from the face direction to the legs direction occurs faster than normal.

In addition, if the blower vent changeover dial 72 is rotated to the left as far as possible and the blower vent curve shows that the temperature dial 48 is between position D and position E, a state occurs in which a gradual change begins from air being blown in the direction of the face to the direction of the legs (the second blower vent changeover damper 38 begins to open the blower vent 44). When the temperature dial 48 is between positions F and G, the blown air is directed solely toward the legs (the second blower vent changing damper 38 completely opens blower vent 44 and closes blower vent 42). When the temperature dial 48 is rotated from the low temperature side to the high temperature side, the changing period of the blower vents from the face direction to the legs direction occurs slower than normal.

The same holds true for the blower vent position changes in FIGS. 3, 4, 6, 7.

Furthermore, when the switch 54 is pressed, so that the inside air indicating lamp 56 is turned on, on all the ranges between the positions A and G by the changeover damper 14, the air from the air intake vent 22 is provided to supply and circulate at the largest volume, so that the rotation angle of the changeover damper 14 is left under the condition in which the air intake vent 22 is fixed open at its widest position.

Accordingly, when the occupant wants to cool the inside of the cabin quickly, such as in the summer and so on, if the temperature dial 48 is rotated to the left as far as possible, as seen in FIG. 2, within the low temperature indicating area L, it is at the position A in FIG. 3. The largest volume of cool air is supplied to the upper half of the body of said occupant. Reversely, when the occupant wants to raise the temperature inside the cabin, such as in the winter and so on, if the temperature dial 48 is rotated clockwise as far as possible as seen in FIG. 2, within the high temperature indicating area H, it is at the position G in FIG. 3. The largest volume of warm air is supplied to the lower half of the body of the occupant. Furthermore, one of the temperatures between these positions can be adjusted by the occupant by moving the temperature dial 48 to a preferred angle and the changeover damper 14, the blower 26, the evaporator 28, the compressor 32, the heater 36 and the second changeover damper 38 are also changed automatically so, that special operations by the occupant are unnecessary.

Next, FIG. 4 shows the mode variation table shown in FIG. 2 when the dehumidifying switch 66 is pressed. When pressed, the dehumidifying indicator 68 is turned on and the mode variation table is changed from a condition seen in FIG. 3 to a condition shown FIG. 4.

That is FIG. 4 is similar to FIG. 3 with regard to the temperature, the blower, the switch of inside and outside air and the blower vents. However, in FIG. 4 the compressor is repeatedly rotated at the highest level and stopped and the defrosting damper 35 opens the defrosting blower exit 37 half-way so that the cabin is dehumidified because a part of the blown wind is always exhausted onto the windshield at all the positions of the temperature dial 48.

Next, when the defrosting switch 62 in FIG. 2 is pressed, the defrosting indicator 64 is turned on and the mode variation table of FIG. 5 is provided instead of that of FIG. 3. Under this condition, a more powerful defrosting is made than the dehumidifying mode in FIG. 4. The blower 26 is rotated at the highest speed, the defrosting damper 35 opens the defrosting blowing exit 37 and closes the two blower vents 42 and 44 by being rotated counter-clockwise as seen in FIG. 1 as far as possible. Accordingly, the largest volume is supplied to the windshield. In addition, the compressor 32 is rotated at the highest speed and the switching damper 14 for drawing in outside air closes the air intake vent 22.

Next, in FIG. 6 a mode variation table of the vehicle without an air conditioner is shown. That is, the air conditioner indicating lamp 52 and the air conditioner switch 53 in FIG. 2 are omitted. By placing the temperature dial 48 between positions F and G in the high temperature indicating area H, the changeover damper 14 moves in the direction from the closure of air intake vent 24 to the closure of air intake vent 22, so that the introduction of outside air is switched to inside air.

And in the mode variation table shown in FIG. 6 the switch by a manual choice operation is possible at the positions except for the position G of the high temperature indicating area H.

Furthermore, in FIGS. 7 and 8 the dehumidifying mode and the defrosting mode without the air conditioner are shown, respectively. In FIG. 7 the conditions are almost the same as those in FIG. 4. But, FIG. 7 is different from FIG. 4 in that the temperature of the blower vents being slowly raised at the positions A to E of the temperature dial 48. And FIG. 8 is different from FIG. 5 in that the heater is driven at the largest volume, so as to blow the complete blown volume in the vicinity of the windshield.

As the present invention comprises the above condition, it has an excellent effect in that the desired air conditioning state is simple obtained.

What is claimed is:

1. An air conditioning device for a vehicle comprising:
    a temperature adjusting means for manually adjusting temperature within a temperature range from a low temperature to a high temperature, said temperature adjusting means being operable by an occupant through a range of positions corresponding to said temperature range;
    a blowing means for gradually changing the volume of air blown through said air conditioning device within an air volume range, from a predetermined maximum air volume to a predetermined minimum air volume and back again to said predetermined maximum air volume, in correspondence with the positioning of said temperature adjusting means within said temperature range through the lowest temperature position through an intermediate temperature position and on through the highest temperature position, respectively;
    a first supplying means in communication with said blowing means for supplying cool air which is gradually changed from a condition under which said cool air is supplied at the predetermined maximum air volume to a condition under which said cool air is supplied at the predetermined minimum air volume in accordance with the positioning of said temperature adjusting means from the lowest to the highest temperature positions, respectively;
    a second supplying means in communication with said blowing means for supplying warm air which is gradually changed from a condition under which said warm air is supplied from the predetermined minimum air volume to a condition under which said warm air is supplied at the predetermined maximum air volume in accordance with the positioning of said temperature adjusting means from the lowest to the highest temperature positions, respectively;
    a first changeover means for drawing in inside and outside air by which the occupant can choose a condition under which air inside a cabin is led to said blowing means or air outside said cabin is led to said blowing means, when said air inside said cabin is selected said air inside said cabin is led to said blowing means independently from the positioning of said temperature adjusting means and when said air outside said cabin is selected, the proportion of air inside said cabin and air outside said cabin that is led to said blowing means varies in accordance with the positioning of said temperature adjusting means; and
    a second changeover means for changing a blowing direction by which said blowing direction is gradually changed from an upper half of the body of said occupant to a lower half of the body of said occupant depending upon the positioning of said temperature adjusting means;
    wherein said blowing means, said first changeover means and said second changeover means are controlled in correspondence with the positioning of said temperature adjusting means.

2. An air conditioning device for a vehicle according to claim 1, wherein said blowing direction which is directed toward the upper half of the body in a wide lower temperature range of said temperature adjusting means, is slowly changed from the upper half of the body toward the lower half of the body in the intermediate temperature range of said temperature adjusting means and is directed toward the lower half of the body in a wide higher temperature range of said temperature adjusting means by said first changeover means.

3. An air conditioning device for a vehicle according to claim 1, wherein said cool air which is supplied at the predetermined maximum air volume in the wide lower temperature range of said temperature adjusting means, is slowly decreased from the predetermined maximum air volume to the predetermined minimum air volume in a middle range between the wide lower temperature and the narrow intermediate temperature ranges of said temperature adjusting means and is constantly supplied at the predetermined minimum air volume in the narrow intermediate temperature and the other temperature ranges of said temperature adjusting means by means of said first supplying means.

4. An air conditioning device for a vehicle according to claim 1, wherein said air inside said cabin is led to said blowing means in the narrow lower temperature range of said temperature adjusting means, air which is led to said blowing means is quickly changed from said air inside said cabin to said air outside said cabin on the remaining lower temperature ranges of said temperature adjusting means, said air outside said cabin is led to said blowing means in the middle range between the lower temperature and the higher temperature ranges of said temperature adjusting means, said air which is led to said blowing means is quickly changed from said air outside said cabin to said air inside said cabin in the higher temperature range except for the narrowly higher temperature range of said temperature adjusting means and said air inside said cabin is led to said blowing means in the narrow higher temperature range of said temperature adjusting means by means of said first changeover means.

5. An air conditioning device for a vehicle according to claim 1, wherein said device further comprises an operation panel having said temperature adjusting means in the center of said operation panel, a switch at the upper right side of said operation panel, for changing over inside and outside air, a changeover slide on the right side of the lower left portion of said operation panel for changing blower vents, and a regulating slide on the left side of the lower left portion of said operation panel for regulating said volume of air blown.

6. An air conditioning device for a vehicle according to claim 5, further including a switch wherein the condition under which said air inside said cabin is led to said blowing means or said air outside said cabin is led to said blowing means may be selected independently from the positioning of said temperature adjusting means by said switch.

7. An air conditioning device for a vehicle according to claim 5, wherein said blowing direction may be changed independently from the positioning of said temperature adjusting means by said changeover slide.

8. An air conditioning device for a vehicle according to claim 5, wherein said volume of air blown may be changed independently from the positioning of said temperature adjusting means by said regulating slide.

9. An air conditioning device for a vehicle comprising:
 a temperature adjusting means for manually adjusting temperature within a temperature range from a low temperature to a high temperature, said temperature adjusting means being operable by an occupant through a range of positions corresponding to said temperature range from a highest temperature through a range of intermediate temperatures to a lowest temperature;
 a blowing means for gradually changing the volume of air blown through said air conditioning device within an air volume range, from a predetermined maximum air volume to a predetermined constant minimum air volume and back again to said predetermined maximum air volume, in correspondence with the positioning of said temperature adjusting means within said temperature range, said predetermined maximum air volume being required at both the high and low ends of said temperature range and said predetermined constant minimum air volume corresponding to said intermediate temperatures;
 a first supplying means in communication with said blowing means for supplying cool air which is gradually changed from a condition under which said cool air is supplied at the predetermined maximum air volume to a condition under which said cool air is supplied at the predetermined minimum air volume in accordance with the positioning of said temperature adjusting means from the lowest to the highest temperature positions, respectively, and is controlled by said controlling means;
 a second supplying means in communication with said blowing means for supplying warm air which is gradually changed from a condition under which said warm air is supplied from the predetermined minimum air volume to a condition under which said warm air is supplied at the predetermined maximum air volume in accordance with the positioning of said temperature adjusting means from the lowest to the highest temperature positions, respectively, and is controlled by said controlling means;
 a first changeover means for drawing in inside and outside air by means of which the operation of said occupant can make a choice of a condition under which air inside a cabin is led to said blowing means or air outside said cabin is led to said blowing means, when said air inside said cabin is selected, wherein said air inside said cabin is led to said blowing means independently from the positioning of said temperature adjusting means and when said air outside said cabin is selected, the proportion of air inside said cabin and air outside said cabin that is led to said blowing means varying in accordance with the positioning of said temperature adjusting means;
 a second changeover means for gradually changing a blowing direction from the upper half of the body of said occupant toward the lower half of the body of said occupant in accordance with the positioning of said temperature adjusting means; and
 a controlling means for controlling said blowing means, said first changeover means and said second changeover means in correspondence with the positioning of said temperature adjusting means.

10. An air conditioning device for a vehicle according to claim 9, wherein said device further comprises an operation panel which is mounted to a dashboard inside said cabin, said operation panel having said temperature adjusting means centered on said operation panel.

11. An air conditioning device for a vehicle according to claim 10, wherein said temperature adjusting means comprises an indicator so as to be rotatably directed at one position of said temperature range for indicating a low temperature or a high temperature.

12. An air conditioning device for a vehicle according to claim 11, wherein said temperature inside said cabin, said volume of air blown, said blowing direction, said cool air and said warm air supplied and said inside and outside air drawn in are adjusted by the position of said indicator.

13. An air conditioning device for a vehicle according to claim 12, wherein said operation panel further comprises a dehumidifying switch at the upper left portion of said operation panel, said dehumidifying switch being connected to said controlling means.

14. An air conditioning device for a vehicle according to claim 13, wherein when said dehumidifying switch is pressed by said occupant, said device dehumidifies said cabin independently from the positioning of said temperature adjusting means in such a way that a part of said volume of air blown is transmitted to a windshield of said cabin by said controlling means.

15. An air conditioning device for a vehicle according to claim 12, wherein said operation panel further comprises a defrosting switch at the upper left portion of said operation panel said defrosting switch being connected to said controlling means.

16. An air conditioning device for a vehicle according to claim 15, wherein when said defrosting switch is pressed by said occupant, said device defrosts a large portion of said windshield of said cabin by means of said controlling means independently from the positioning of said temperature adjusting means.

17. An air conditioning device for a vehicle according to claim 16, wherein when said occupant selects a case where volume of air blown is changed to said predetermined maximum air volume in spite of the temperature positions of said temperature adjusting means, said blowing direction is changed to the middle position between the upper half and the lower half of the body of said occupant at all the temperature positions of said temperature adjusting means, said occupant is not able to select the condition under which said air inside said cabin is led to said blowing means by said first changeover means, only said air outside said cabin is led to said blowing means at all the temperature positions of said temperature adjusting means and said warm air is changed so as to be supplied at the predetermined maximum air volume at all the temperature positions of said temperature adjusting means.

18. An air conditioning device for a vehicle comprising:
   a temperature adjusting means for manually adjusting temperature within a temperature range from a low temperature through intermediate temperatures to a high temperature, said temperature adjusting means being operable by an occupant through a range of positions corresponding to said temperature range;
   a blowing means for gradually changing the volume of air blown through said air conditioning device within an air volume range, that is, from a predetermined maximum air volume to a predetermined minimum air volume and back again to said predetermined maximum air volume, in correspondence with the positioning of said temperature adjusting means within said temperature range, said predetermined maximum air volume being required at both the high and low ends of said temperature range and said predetermined minimum air volume being required at the intermediate temperatures of said range;
   a first changeover means for drawing in inside and outside air by which the operation of said occupant can make a choice of a condition under which air inside a room is led to said blowing means or air outside said cabin is led to said blowing means, when said air inside said cabin is selected, by which said air inside said cabin is led to said blowing means independently from the positioning of said temperature adjusting means and when said air outside said cabin is selected, which is changed from the condition under which said air outside said cabin is led to said blowing means to the condition under which said air inside said cabin is led to said blowing means, on the high end of said temperature range in accordance with the positioning of said temperature adjusting means; and
   a second changeover means for gradually changing a blowing direction from the upper half of the body of said occupant toward the lower half of the body of said occupant in accordance with the positioning of said temperature adjusting means.

19. An air conditioning device for a vehicle according to claim 18, wherein a supplying means is provided for supplying warm air which is gradually changed from a condition under which said warm air is supplied from the predetermined minimum air volume to a condition under which said warm air is supplied at the predetermined maximum air volume in accordance with the positioning of said temperature adjusting means.

20. An air conditioning device for a vehicle according to claim 19, wherein said device further comprises an operation panel which is mounted to a dashboard inside said cabin, said operation panel having said temperature adjusting means centered on said operation panel.

21. An air conditioning device for a vehicle according to claim 20, wherein said operation panel further comprises a dehumidifying switch at the upper left portion of said operation panel.

22. An air conditioning device for a vehicle according to claim 21, further including blower vents located in said cabin wherein when said dehumidifying switch is pressed by said occupant, the temperature of the air from said blower vents is gradually increased in the low and middle temperature ranges in accordance with the positioning of said temperature adjusting means.

23. An air conditioning device for a vehicle according to claim 20, wherein said operation panel further comprises a defrosting switch on the upper left portion of said operation panel.

24. An air conditioning device for a vehicle according to claim 23, wherein when said defrosting switch is pressed by said occupant, said supplying means supplies the predetermined maximum air volume of said warm air so that said predetermined maximum air volume is transmitted to a windshield of said cabin.

25. An air conditioning device for a vehicle according to claim 24, wherein when said occupant selects a case where the temperature of said volume of air blown is changed to the highest temperature in spite of the temperature positions of said temperature adjusting means, said volume of air blown is changed to said predetermined maximum air volume among all the temperature positions of said temperature adjusting means said blowing direction is changed to the middle between the upper half and the lower half of the body of said occupant at all the temperature positions of said temperature adjusting means, said occupant is not able to select the condition under which said air inside cabin is led to said blowing means by said first changeover means, only said air outside is led to said blowing means at all the temperature positions of said temperature adjusting means and said warm air is changed so as to be supplied at the largest volume among all the temperature positions of said temperature adjusting means.

* * * * *